United States Patent [19]

Rader

[11] 4,452,179
[45] Jun. 5, 1984

[54] ADVANCED POULTRY DRINKER CONSTRUCTION

[75] Inventor: Helmut Rader, McLean, Va.

[73] Assignee: Monoflo International, Inc., McLean, Va.

[21] Appl. No.: 390,774

[22] Filed: Jun. 21, 1982

Related U.S. Application Data

[63] Continuation-in-part of Ser. No. 378,491, May 14, 1982, abandoned.

[51] Int. Cl.³ .................. A01K 39/02; A01K 7/02
[52] U.S. Cl. .................................................. 119/81
[58] Field of Search ........................ 119/75, 80, 81; 137/408

[56]  References Cited

U.S. PATENT DOCUMENTS

| | | | |
|---|---|---|---|
| 2,632,463 | 3/1953 | Martin | 137/408 |
| 3,590,782 | 7/1971 | Kantor | 119/81 |
| 3,861,358 | 1/1975 | Bowell | 119/79 |
| 4,164,201 | 8/1979 | Vanderhye | 119/81 |
| 4,180,015 | 12/1979 | Dawson, Jr. | 119/80 X |
| 4,196,699 | 4/1980 | Leeming | 119/81 |
| 4,215,653 | 8/1980 | Pirovano | 119/81 |
| 4,323,036 | 4/1982 | Salerno | 119/81 |

FOREIGN PATENT DOCUMENTS 1059704 6/1959 Fed. Rep. of Germany .
1238381 7/1971 United Kingdom ............. 119/81

OTHER PUBLICATIONS

Monoflo Round Drinkers Worldwide Brochure, ©1980.

Primary Examiner—Robert P. Swiatek
Attorney, Agent, or Firm—Cushman, Darby & Cushman

[57]  ABSTRACT

A poultry drinker includes a headless bell with a replaceable cartridge assembly for operatively attaching the bell to a conventional valve and a stand or a ballast. A flat annular support surface at the headless top of the bell cooperates with an annular support surface of the cartridge assembly, and a nut engages external threads on a tubular body of the cartridge assembly to clamp the bell annular support between itself and the cartridge annular support. An internal shelf in the cartridge to operate the valve, water passage openings are formed in the tube above the shelf, and the tubular body is connected to the valve by threads or the like. A flange radially extending from the cartridge adjacent the cartridge annular support is received by a cutout in the bell annular support to prevent rotation between the bell and cartridge. A screw-threaded post operatively attached to the shelf and extending through the cartridge annular support member provides attachment to the stand or ballast member.

14 Claims, 5 Drawing Figures

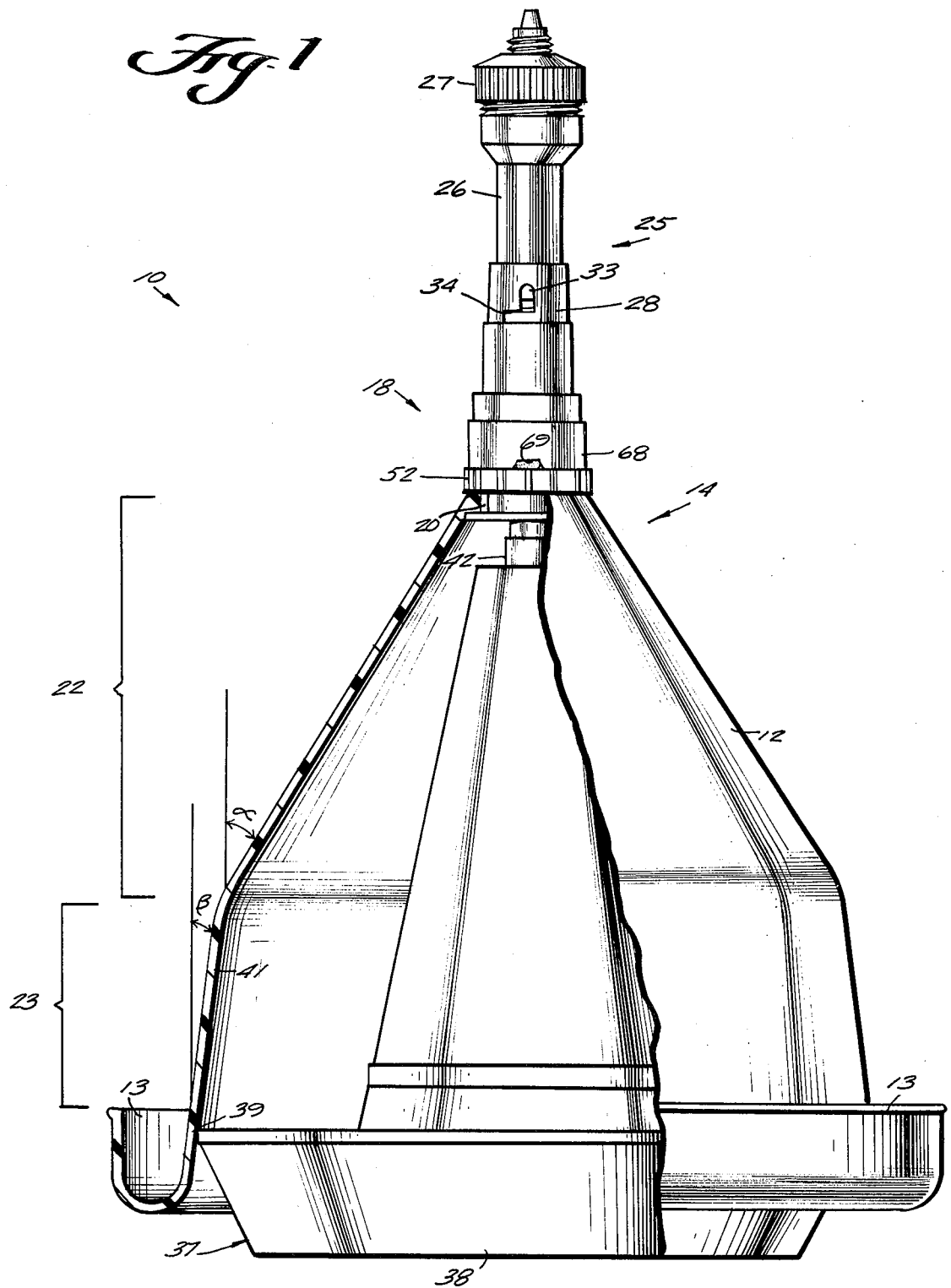

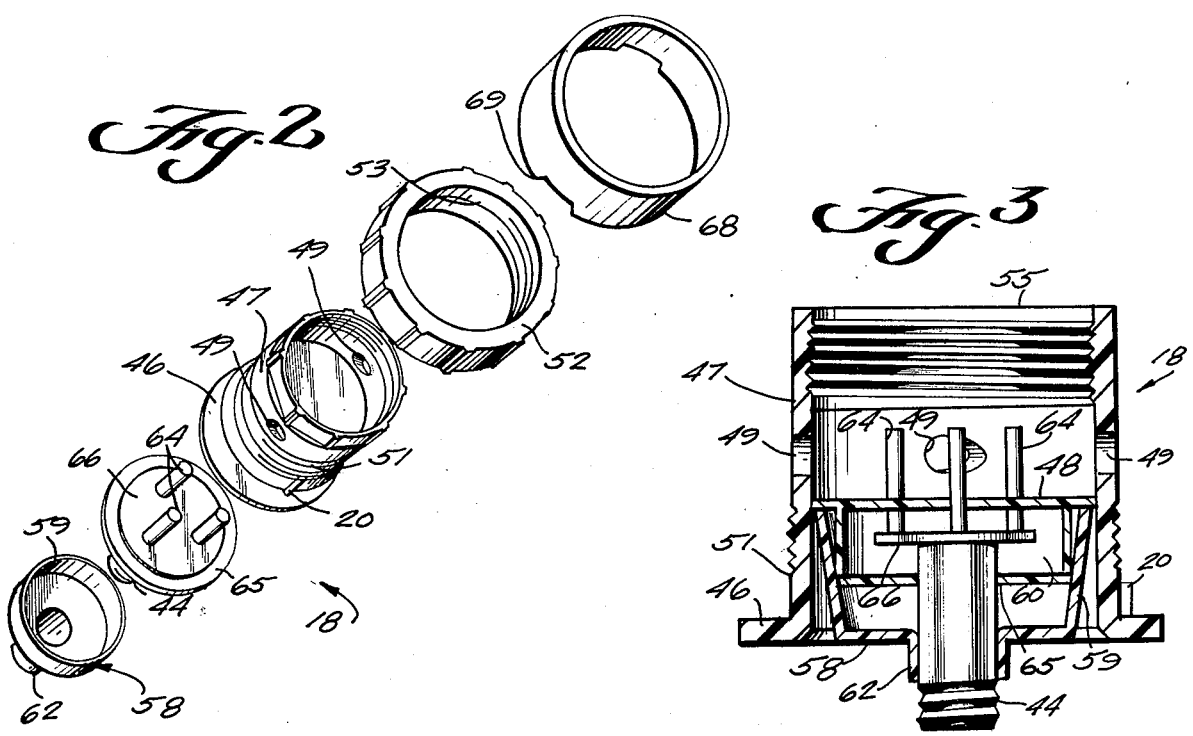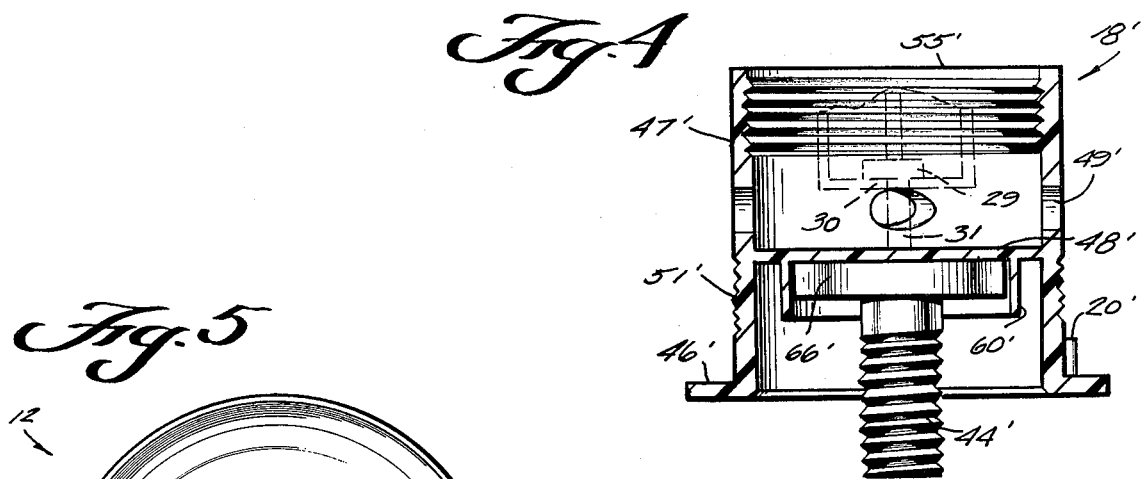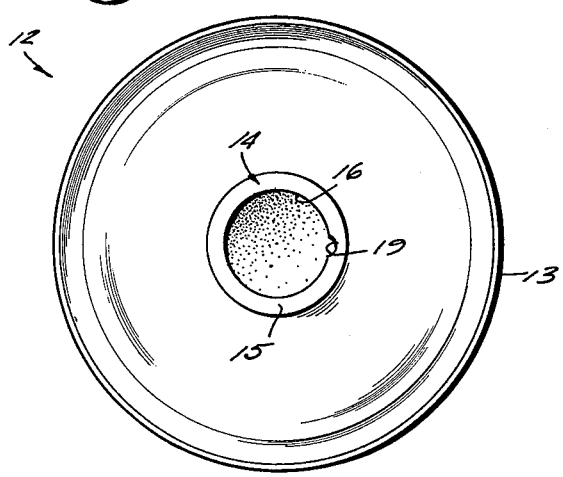

ADVANCED POULTRY DRINKER CONSTRUCTION

CROSS-REFERENCE TO RELATED APPLICATION

This application is a continuation-in-part of my application Ser. No. 378,491 filed May 14, 1982 and now abandoned.

BACKGROUND AND SUMMARY OF THE INVENTION

A wide variety of poultry drinkers are commercially available worldwide. These poultry drinkers conventionally include a bell including a watering trough at the bottom thereof, and a neck at the top. Operatively associated with the neck a valve is provided, as well as some sort of valve actuating structure mounted on the bell itself in the neck area. Typical of these structures are those shown in U.S. Pat. Nos. 3,590,782; 4,196,699; and 4,215,653.

It has been found that when drinkers are used in the field they oftentimes are subjected to rough treatment, and a common point of breakage is in the area surrounding the neck. Further, with large increases in transportation prices in the recent past, the costs associated with shipping poultry drinkers often approach, or even exceed, the cost of producing the drinkers themselves.

The poultry drinker, and component parts thereof, according to the present invention take into account the above-mentioned problems associated with the present commercial production of poultry drinkers, and provide a structure that is easy to ship, includes readily replaceable components at the prime area of breakage, and yet is simply assembled in the field, and functions at least substantially as well as presently available poultry drinkers.

The poultry drinker according to the present invention is headless. That is at the portion of the bell opposite the top no head is provided, but rather merely an opening with an annular support surface defining the opening. Without a head, the drinker can be easily shipped, taking up much less space than most conventional drinkers of the same basic size.

According to the present invention connection of the drinker bell to the valve means, and to a ballast, is provided by a replaceable cartridge assembly. The cartridge is insertable into operative engagement with the annular support surface defining the opening at the top of the bell, and it is held in place by a nut threaded into engagement with a portion of the cartridge extending out through the bell open top. A conventional valve assembly may be attached to the cartridge, and openings are provided in the cartridge to allow water flow from the valve down the exterior surface of the bell into the trough.

At the bottom side of the cartridge, interior of the bell, a threaded post is provided for connection to a stand, ballast bowl, or the like. Since damage to drinkers most often occurs at the connection to the valve, valve actuating portion, or ballast or stand connection, and since the replaceable cartridge according to the invention performs all those functions, if any damage does ensue the cartridge may merely be replaced, and the entire drinker need not be discarded.

The replaceable cartridges according to the present invention may be of several types to provide great flexibility in the type of drinker irrespective of the construction of the bell or valve assembly. For instance one type of cartridge can provide for operation of the drinker solely as a suspension type drinker, such as shown in U.S. Pat. No. 3,590,782. Another type of cartridge may provide for the utilization of the drinker primarily as a ground-supported drinker, such as shown in U.S. Pat. No. 4,164,201. A third type cartridge may provide for utilization of the drinkers either a standing or hanging type drinker, such as shown in U.S. Pat. No. 4,196,699.

The bell according to the present invention is preferably dimensioned to provide for maximum stackability thereof. According to one preferred embodiment of the invention, the bell is formed having a top conical portion with a large angle of taper, and a bottom conical portion with a small angle of taper. However the taper of the bottom portion is substantial enough to provide good nestability of the drinkers. A headless bell with such nestability provisions allows a fantastic increase in the number of complete unassembled drinkers that may be packaged within a given volume, and can result in substantially lower transportation costs.

It is the primary object of the present invention to provide a versatile, easily shipped, effective poultry drinker. This and other objects of the invention will become clear from an inspection of the detailed description of the invention, and from the appended claims.

BRIEF DESCRIPTION OF THE DRAWINGS

FIG. 1 is a side view, partly in cross-section and partly in elevation, illustrating an exemplary assembled drinker according to the present invention;

FIG. 2 is an exploded perspective view of a cartridge assembly of the drinker of FIG. 1;

FIG. 3 is a side cross-sectional view of the cartridge assembly of FIG. 2, when in assembled condition;

FIG. 4 is a side cross-sectional view of another form of the cartridge assembly; and FIG. 5 is a top plan view of the bell of the drinker in FIG. 1.

DETAILED DESCRIPTION OF THE DRAWINGS

An exemplary poultry drinker 10 according to the present invention includes a bell 12 (see FIGS. 1 and 5 in particular) with a watering trough 13 formed at the bottom thereof, and an open headless top indicated generally by reference numeral 14. The top includes a substantially planar annular support surface 15 defining the actual opening 16 in the drinker top. The opening 16 receives a cartridge assembly according to the present invention, shown generally by reference numerals 18, 18' in FIGS. 2 through 4. A portion of the annular support surface 15 defines a cutout 19 which receives a flange 20, 20' associated with the cartridge assembly 18, 18' to provide means for preventing rotation between the cartridge assembly 18, 18' and the bell 12 during use.

The bell 12 is commonly formed of injection molded plastic. The bell may have a wide variety of shapes, such as those illustrated in U.S. Pat. Nos. 3,590,782; 4,196,699; or 4,215,653. However when maximum nestability is desired the bell will preferably have the shape illustrated in FIG. 1, having a top portion 22 comprising the frustum of a right circular cone having a relatively large angle $\alpha$ and having a bottom portion 23 also comprising a frustum of a right circular cone, but having a smaller angle $\beta$. The angle $\alpha$ is not critical, but is normally about 30°. The angle $\beta$ is approximately 7° to 9°.

If β is too much smaller than 7°, the drinker does not nest properly. If it is too much larger than 9°, the drinker must be made wider than it otherwise would be, and its center of gravity is changed, and it is not as well-balanced.

Another component of the drinker 10 comprises a valve assembly 25, which preferably is a conventional valve assembly such as shown in U.S. Pat. No. 4,196,699 or U.S. Pat. No. 4,164,201. The valve assembly 25 conventionally includes a stem 26, a top cap 27 adapted to be connected to the source of water, an adjustor collar 28, and an interior valve member (shown in dotted line at 29 in FIG. 4) cooperating with a valve seat (30 in FIG. 4). Actuation of the valve member may be provided by an external structure engaging the valve seat 30 (as in U.S. Pat. No. 4,196,699), or by a component extending outwardly from the stem 26 operatively associated with the valve member 29 (such as valve actuator stem 31 in FIG. 4; valves of this general type are shown in U.S. Pat. No. 4,164,201). A spring (not shown) is provided interiorly of the adjustor collar 28, and a spring compression ring 33 can move to either of two detent positions (see cutout 34 in FIG. 1) to provide varying degrees of spring force application, as is known per se in commercially available poultry drinkers.

The drinker 10 may or may not include a stand or ballast cone, such as the stand/ballast cone 37 illustrated in FIG. 1. The stand 37 is conventional, having a pan 38 formed at the bottom, and having a hollow interior. A ballast material, such as water, sand, or the like, can be provided in the pan 38, or can be placed inside the hollow interior, with a cap at the bottom to prevent the ballast material from falling out. The pan 38 may include an enlarged annular lip 39 which is slightly spaced from the interior surface 41 of the bell 12 in order to prevent too much sideways movement of the bell 12 for the situation wherein the pan 38 extends outwardly from the bottom of the bell 12 and sits on the ground. In this situation there is some relative movement between the bell 12 and the stand 37, and the lip 39 prevents too much sideways movement during this reciprocation. If the drinker 10 is to be used only as a suspension drinker, the bottom of the pan 38 need not extend outwardly from the bottom of the bell 12.

At the top of the stand 37 is a tube 42 which is adapted to be connected to the cartridge 18. This is preferably provided by forming interior threading in the tube 42, which cooperates with the exteriorly threaded post 44, 44' (see FIGS. 2 through 4) extending downwardly from the cartridge 18, 18'. While the post 44 preferably is a solid member with external threading, it also may be a tubular member with internal threading, with the receiving-component on the stand or ballast member 37 adapted accordingly.

The cartridge 18 (FIGS. 2 and 3) is utilized when it is desirable to have a drinker 10 that can be suspended or can sit on the ground. The cartridge 18' is utilized when it is desirable that the drinker 10 be only a suspension type drinker. Functionally equivalent components in the FIGS. 3 and 4 embodiments are designated by the same reference numeral, only in the FIG. 4 embodiment followed by a "'".

The cartridge 18 includes an annular support surface 46 which engages the underside of the bell annular support surface 15 as the flange 20 is received within cutout 19. Extending upwardly from the annular support surface 46 is a tubular body member 47. The tubular body member 47 includes a valve actuating component formed therewith. In the illustrative embodiment illustrated in the drawing, this comprises the horizontally extending interior shelf 48, which is integral with the body 47. Depending upon the type of valve assembly 25 utilized, the shelf 48 may have a central interiorly upwardly projecting pin (not shown) to actuate the valve.

Means are provided defining a plurality of water-passing openings 49 in the tubular body member 47, just above the shelf 48. Preferably four such openings 49 are provided. When shelf 48 actuates valve assembly 25, water flows from the valve into the interior of the tube 47 above shelf 48, and out the openings 49 down the side of the bell.

Means are also provided for releasably holding the cartridge assembly so that the support surface 46 is in contact with the bell support surface 15. Preferably such means comprise exterior threading 51 on the surface of the tube 47 just above the support surface 46, and below the openings 49; and a plastic nut 52 having interior threadings 53 cooperating with the exterior threading 51. The nut 52 engages the top of the bell annular support surface 15, clamping support surface 15 between it and the cartridge annular support surface 46.

Means are also provided for releasably attaching the valve means 25 to the cartridge tubular member 47. This is preferably provided by interior threading 55 adjacent the open top of the cartridge 47, which interior threading cooperates with an exteriorly threaded tubular portion of the valve means adjustor collar 28 (see U.S. Pat. No. 4,196,699).

In the suspension/hanging cartridge assembly 18, illustrated in FIGS. 2 and 3, the threaded post 44 is mounted for slight linear movement along the axis of the tubular member 47 with respect to the shelf 48. This may be accomplished by providing the flexible sealing cup 58, which is made of flexible plastic, rubber, or the like. The flexible cup may be attached at one end 59 thereof between the rings 60, which depend downwardly from shelf 48 and are integral therewith, and the interior surface of the tubular member 47. Such securement can be facilitated by providing an ultrasonic weld or the like.

At the other end 62 thereof, the cup is attached to the post 44, above the threads. Again this attachment may be facilitated by an ultrasonic weld. At the end of post 44 opposite the threading are provided a plurality of pins 64 which pass through openings (not shown) in shelf 48, which openings are slightly larger than the diameter of the pins 64. The pins 64 extend upwardly from, and are integral with, the disc 66 formed at the end of post 44 opposite the threading. Due to the flexibility of the cup member 58, the pins 64 may move linearly with respect to the shelf 48, parallel to the axis of the tubular member 47. The cup 58 also prevents any water which may pass through the openings receiving the pins 64 from going into the interior of the bell 12.

While the above arrangement for the cup 58 and post 44 is operable, a more reliable manner of providing for relative movement of post 44 with respect to shelf 48 is to provide the plastic ring 65 ultrasonically welded to ring 60 and capturing disc 66 between it and shelf 48. Ring 65 guides movement of post 44, and by engaging disc 66 stops downward movement thereof. Flexible sealing cup 58 is not permanently attached to post 44 or ring 60 (or inside tube 47), but rather is merely held in engagement therewith to form a seal to prevent water leakage.

For the suspension-only cartridge assembly 18', the cup 58 and pins 64 are not necessary. In this situation, a disc 66' is formed on the end of the post 44' opposite the threads, this disc 66' having substantially the same outside diameter as the inside diameter of ring 60'. The disc 66' is received within the ring 60', and may be ultrasonically welded thereto. In this embodiment, no holes are formed in the shelf 48'.

In some circumstances, it is desirable to prevent water from "splashing" out of the openings 49, 49'. This may be accomplished by utilizing an antisplash ring 68, which is merely a plastic tube having an inside diameter slightly greater than the outside diameter of the tubular member 47, 47', and having a length approximately the distance between the nut 52 and adjustor collar 28 when the drinker 10 is assembled (see FIG. 1). Cutouts 69 are formed in the bottom portion of the ring 68 (e.g. three cutouts 69 are provided when four openings 49, 49' are provided). Water passing out of openings 49, 49' will then impact the interior of the antisplash ring 68, and trickle down and flow out of the cutouts 69 down the exterior surface of the bell 12.

OPERATION

The bell 12, stand 37, and cartridge tubular member 47, 47' are formed from injection molded plastic. If the cartridge assembly is to become a hanging/standing cartridge assembly 18, holes are drilled in the shelf 48, pins 64 of the post 44 are passed through these holes, ring 65 is ultrasonically welded in place, and the flexibility of cup member 58 secures it between the ring 60 and the interior surface of tubular member 47, and to post 44. If the cartridge assembly is to become a suspension-only cartridge assembly 18', the disc 66 of post 44' is ultrasonically welded to ring 60'.

After injection molding of the tubular body member 47, 47', the four openings 49, 49' are formed therein by merely passing two drill bits through the wall of tubular member 47, 47', each drill bit forming two of the openings 49, 49'.

The bells 12 are stacked (nested) for shipment, and because they are headless and are contoured particularly for nesting, they can be shipped to the field in a minimum size shipping container (or a maximum number of bells may be provided in a particular size shipping container). The stands 37 likewise are nested and shipped to the field in that manner, while the cartridge assemblies 18, 18' and the valve assemblies 25 are provided loosely, or in plastic bags, within the shipping container and the volume not taken up by bells 12 or stands 37.

When they arrive in the field, the drinkers 10 are assembled. This is easily accomplished first by unthreading nut 52 from threads 51 of the cartridge assembly 18, and passing the cartridge assembly up through the openings 16 in the top of bell 12 from the interior of the bell until the flange 20 is received by cutout 19, and cartridge support surface 46 engages the underside of the bell annular support surface 15. Then nut 52 is threaded into engagement with threads 51, to clamp the cartridge 18 in place. Should any damage occur to the cartridge components, a new cartridge can easily be inserted in its place, and there is no necessity to discard the entire bell 12.

If a stand or ballast 37 is to be utilized, the tubular interiorly threaded top portion 42 thereof is then inserted into the interior of the bell 12, and moved into engagement with the threads on post 44, and threaded into engagement therewith. Alternatively, the stand 37 can be connected to the cartridge 18 before the cartridge is inserted into place with respect to the bell 12.

The antisplash ring 68, if utilized, is loosely placed over the exterior of the tube 47 above nut 52, and covering openings 49, and then the adjustor collar 28 of the valve assembly 25 is screwed into engagement with the threads 55 of the cartridge tubular member 47. The valve 27 is connected to a water source in the conventional manner, and the drinker 10 is ready for operation, the adjustment component 33 of the valve assembly 25 being placed in the lower position if the drinker is to be operated as a standing drinker, and in the upper position if it is to be a suspension drinker, thereby varying the compression of the spring between the adjustor collar 28 and stem 26. The drinker then operates in the manner described in U.S. Pat. No. 4,196,699.

It will thus be seen that according to the present invention an advanced poultry drinker, and cartridge assembly for utilization therein, have been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A poultry drinker comprising:
    a bell including a watering trough formed at the bottom thereof, and an open headless top including an annular support surface;
    a valve means including a valve body and valve member for allowing or preventing flow of liquid through the valve body to the trough;
    a replaceable cartridge assembly for insertion into operative association with said bell extending through said bell open top, and having an annular support surface engaging said bell annular support surface, and including an upwardly extending tubular member having a valve actuating component formed therewith, and means defining a plurality of water-passing openings for allowing water flow from the valve means therethrough, and subsequently down the outer surface of the bell to the trough;
    means for releasably holding said cartridge assembly support surface in contact with said bell support surface;
    means for preventing rotation, in use, between said cartridge and said bell; and
    means for releasably attaching said valve means to said cartridge tubular member.

2. A drinker as recited in claim 1 further comprising a stand or ballast member, and wherein said replaceable cartridge assembly includes means extending downwardly therefrom, including a portion on the opposite side of said cartridge assembly annular support surface as said water-passing openings, for attaching said cartridge assembly to said stand or ballast member.

3. A drinker as recited in claim 2 wherein said means for attaching said cartridge assembly to said stand or ballast member comprises an exteriorly threaded post; and wherein said stand or ballast member comprises an interiorly threaded tubular member for cooperation with said exteriorly threaded post.

4. A drinker as recited in claims 1 or 2 wherein said means for releasably holding said cartridge assembly support surface in contact with said bell annular support surface comprises exterior threads formed on said cartridge tubular member above said cartridge annular support surface, and a nut having threads cooperating with said tubular member external threads.

5. A drinker as recited in claim 4 wherein said means for preventing rotation between said cartridge assembly and said bell comprises a flange extending radially outwardly from said tubular member, and means defining a cutout in said bell annular support surface for receipt of said flange.

6. A drinker as recited in claim 4 wherein said tubular member valve actuating component comprises an interior integral shelf disposed between said water-passing openings and said cartridge assembly annular support surface along the axis of said cartridge tubular member.

7. A drinker as recited in claim 1 wherein said bell includes two right circular cone frustums of different angles of inclination, including a first portion extending from said bell open headless top to a central portion of said bell having an angle of inclination $\alpha$, and a second right circular cone portion extending from said central portion of said bell to said trough, said second conical portion having an angle of inclination $\beta$, wherein $\beta$ is less than $\alpha$, and is approximately 7°–9°.

8. A cartridge assembly for use in a poultry drinker and comprising:
- a plastic tubular member having an annular support surface formed integrally therewith at one end thereof, said annular support surface extending radially outwardly from said tubular member;
- an interior shelf formed integrally with said tubular member at a central portion thereof;
- means defining a plurality of through-openings in said tubular member on the opposite side of said shelf from said annular support surface; and
- external threads formed on said tubular member in an area thereof between said openings and said annular support surface, and a nut for cooperation with said exterior threads.

9. A cartridge assembly as recited in claim 8 further comprising a post operatively connected to said shelf on the opposite side thereof from said openings.

10. A cartridge assembly as recited in claim 9 wherein said post has exterior threads formed on a portion thereof, and wherein said tubular member has interior threads formed adjacent an end thereof opposite the annular support surface and on the opposite side of said openings from said shelf.

11. A cartridge assembly as recited in claim 9 further comprising a flexible cup for sealing said post with respect to said shelf.

12. A poultry drinker comprising:
- a bell including a watering trough formed at the bottom thereof and an open headless top including an annular support surface;
- a valve means including a valve body and valve member for allowing or preventing flow of liquid through the valve body to the trough;
- a replaceable cartridge assembly for insertion into operative association with said bell extending through said bell open top, and having an annular support surface engaging said bell annular support surface;
- means for releasably holding said cartridge assembly support surface in contact with said bell support surface, said means comprising exterior threads formed on a portion of said cartridge above said annular support surface, and a nut having threads cooperating with said external threads;
- means for preventing rotation, in use, between said cartridge and said bell; and
- means for releasably operatively attaching said valve means to said cartridge assembly.

13. A drinker as recited in claim 12 wherein said means for preventing rotation between said cartridge assembly and said bell comprises a flange extending radially outwardly from a portion of said cartridge member, and means defining a cut-out in said bell annular support surface for receipt of said flange.

14. A drinker as recited in claim 12 wherein said bell includes two right circular cone frustrums of different angles of inclination, including a first portion extending from said bell open headless top to a central portion of said bell having an angle of inclination $\alpha$, and a second right circular cone portion extending from said central portion of said bell to said trough, said second conical portion having an angle of inclination $\beta$, wherein $\beta$, is less than $\alpha$, and is approximately 7°–9°.

* * * * *

UNITED STATES PATENT AND TRADEMARK OFFICE
CERTIFICATE OF CORRECTION

PATENT NO. : 4,452,179

DATED : June 5, 1984

INVENTOR(S) : Helmut Rader

It is certified that error appears in the above-identified patent and that said Letters Patent is hereby corrected as shown below:

Column 4, line 39, "rings 60, which depend" should read --ring 60 (which depends --; line 40, "," should read --)--.

Column 6, line 44, "a plurality of" should read --at least one--; line 45, "openings" should read --opening--; line 61, "water-passing openings" should read --at least one water-passing opening--.

Column 7, lines 16 and 17, "water-passing openings" should read --at least one water-passing opening--; line 37, "a plurality of through-openings" should read --at least one through-opening--; last line, "openings" should read --at least one opening--.

Column 8, line 6, "openings" should read --at least one opening--.

This certificate supersedes certificate of correction issued January 29, 1985.

Signed and Sealed this

Twenty-second Day of October 1985

[SEAL]

Attest:

DONALD J. QUIGG

Attesting Officer

Commissioner of Patents and Trademarks—Designate